Sept. 4, 1928.

C. R. SHORT ET AL 1,682,871

DIFFERENTIAL GEARING FOR MOTOR VEHICLES

Filed April 16, 1926

Inventors
Charles R. Short
Victor Hughes

By Blackmore, Spencer & Fluli
Attorneys

Patented Sept. 4, 1928.

1,682,871

UNITED STATES PATENT OFFICE.

CHARLES R. SHORT, OF DAYTON, OHIO, AND VICTOR HUGHES, OF DETROIT, MICHIGAN, ASSIGNORS TO GENERAL MOTORS RESEARCH CORPORATION, OF DETROIT, MICHIGAN, A CORPORATION OF DELAWARE.

DIFFERENTIAL GEARING FOR MOTOR VEHICLES.

Application filed April 16, 1926. Serial No. 102,525.

This invention relates to a differential gearing in the rear axle assembly of motor vehicles, whereby the necessary differential movement of the rear traction wheels may be permitted when the vehicle is turned.

The object is to simplify the construction of the parts and the combination, and at the same time facilitate assembling operations relating to the differential mechanism of a light motor car.

The invention consists in the construction of parts and their combination, as more specifically described hereinafter and as illustrated in the accompanying drawing, in which.

In the drawings.

Figures 1, 2, 3:
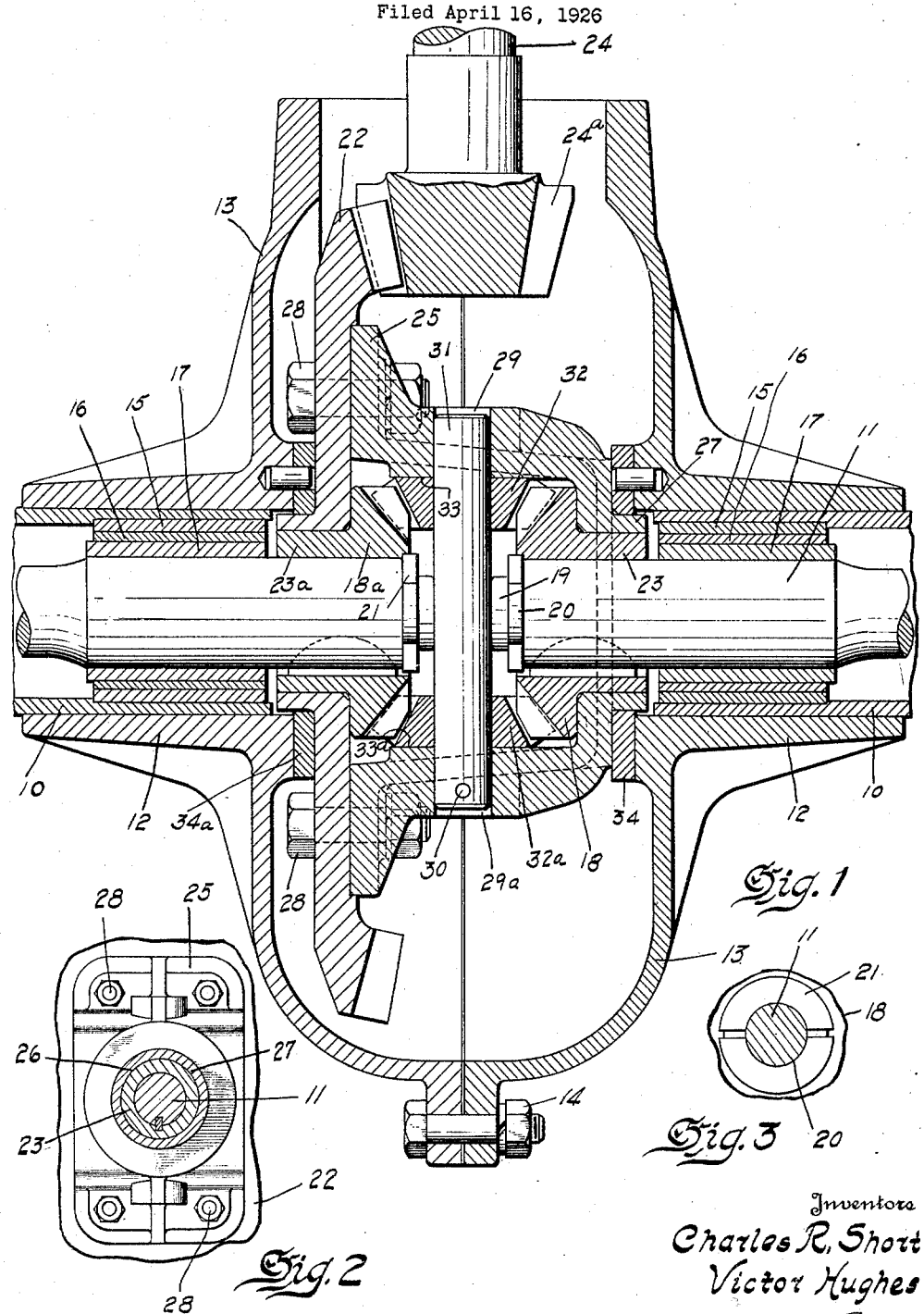
Fig. 1 is a horizontal section through an assemblage, embodying the invention.
Fig. 2 is an elevation of a part constituting the differential cage.
Fig. 3 is a section across the inner end of one of the axle shafts.

Numeral 10 indicates tubular casings for the rear axle shafts 11. The inner ends of the tubular casings 10 are tightly inserted in tubular bosses 12 on differential gear housing 13, which is formed of two similar parts, joined together by the bolts 14, the meeting faces of the two parts of said housing lying in a vertical plane extending at right angles to the rear axle.

Inside of the inner end of each tubular casing 10, is an axle shaft bearing, formed, in the construction shown, of a steel backing 15 and a porous bronze bushing 16, preferably firmly secured to the backing. A hardened steel bushing 17 firmly secured to axle shaft 11 constitutes the journal portion of the inner end of said shaft 11 which bears in the bearing bushing 16.

Keyed to the ends of shaft sections 11 are the usual bevel pinions 18 and 18$^a$. The inner end of each shaft section 11 is reduced as at 19 and has a circumferential groove as at 20, in which is seated a washer made of two sections 21, as indicated in Fig. 3, only one half section of each washer being shown in Fig. 1. The divided washer 21 establishes the innermost position of the gear on each shaft section 11, longitudinally of said section.

The main gear of the differential is indicated at 22. This gear may be of any known type, although it is shown as a bevel gear meshing with a pinion 24$^a$ on a propeller shaft 24. Gear 22 is nicely sleeved on the hub 23$^a$ of the left hand axle shaft pinion 18$^a$, so that said gear 22 may rotate with respect to the gear 18$^a$.

The differential cage is a very simple member of U-formation, having flanges at 25 on the ends of the limbs of the cage and a bearing orifice 26 surrounded by a flange 27 penetrating centrally the yoke member of the U-shaped cage. The cage is detachably bolted to the web of gear 22 by means of bolts 28. The hub 23 of axle shaft gear 18 fits nicely within the bearing opening 26 in the cage.

The U-shaped cage is penetrated by two opposite holes 29 and 29$^a$, the axes of which lie in the same straight line, which intersects, substantially, the axes of the axle shaft sections 11. Removably secured as by key pin 30 in the U-shaped cage, is a removable bearing pin 31, the ends of which are seated in the holes 29 and 29$^a$ and on which are sleeved differential pinions 32 and 32$^a$. The backs of these pinions are plane and take bearing respectively on plane parallel surfaces 33 and 33$^a$ on the inner sides of the opposite limbs of said U-shaped cage. As shown in the drawing, the parallel bearing surfaces 33 and 33$^a$ for the pinions 32 and 32$^a$, are separated from each other by a distance that is less than the distance between the opposite surfaces of the yoke arms between the bearing surfaces and the ends of the arms; this distance should not be greater in any case than the distance between the bearing surfaces; because of this relation, the differential pinions 32 and 32$^a$ can be slid into mesh with axle gear 18, in a direction parallel with the axis of the said gear 18.

The extremities of the reduced portions 19 of axle sections 11, bear on opposite sides of the bearing pin 31, which thus serves for preventing endwise movement of the axle shaft sections inward.

For the purpose of preventing endwise movement of the axle shaft sections 11, outward, the back of gear 22 engages with a plane thrust surface on the gear casing 13 and a plane surface on the yoke portion of the U-shaped differential cage surrounding the flange 27 bears upon a thrust surface on the other side of the casing 13. In practice it may be found desirable to insert a hardened steel bearing plate 34 between the differential cage and the casing 13 and another hardened steel bearing plate 34ª between the back face of gear 22 and casing 13.

It will be seen that the construction shown is simple and inexpensive. The simple U-shaped cage with open sides and flat or plane bearing surfaces for the backs of the differential pinions, permits said pinions to be slipped in or out laterally when removable bearing pin 31 is not in position. The pin may be threaded through the openings in the cage and the pinions. The U-shaped cage may be made of cast iron or may be forged from a steel plate by die pressing operations. Special thrust bearings are not necessary, the longitudinal thrust of the shafts and differential being taken in one direction by the pin 31 and in the other by the bearing surfaces between the casing 13 and gear 22 on one side and between the bearing surfaces on the U-shaped cage and the casing 13 on the other side.

Although we have described and shown one specific embodiment of our invention, it is not intended that the invention shall be limited to the exact particulars described and illustrated, but only by the definitions of the appended claims.

What we claim is:

1. In a motor vehicle transmission, the combination with a rear axle and differential housing, of differential gearing comprising two alined axle shafts, beveled axle gears facing each other adapted to be secured respectively to said shafts, a one piece main gear bearing on one axle gear, a U-shaped differential cage detachably secured to the bearing face of said main gear and having a bearing on the other axle gear; and differential pinions carried by the cage meshing with the axle gears.

2. In a motor vehicle transmission, the combination with a rear axle and a differential housing, of differential gearing comprising two alined axle shafts, beveled axle gears facing each other, adapted to be secured respectively to said shafts, a one piece main gear bearing on one axle gear, a U-shaped differential cage having opposite plane parallel bearing surfaces on the inner sides of the arms and the ends of its arms detachably secured to the tooth carrying face of said main gear and the other end of the cage bearing on the other axle gear; and differential pinions carried by the cage meshing with the axle gears.

3. In a motor vehicle transmission, the combination with a rear axle and differential housing, of differential gearing comprising two alined axle shafts, beveled axle gears facing each other adapted to be secured respectively to said shafts, said axle gears having hubs, a main gear mounted rotatively on the hub of one of said axle gears, a U-shaped differential cage having the ends of its arms detachably secured to said main gear and having a bearing opening receiving the hub of the other axle gear, opposite plane bearing surfaces on the inside of the arms of the cage, differential pinions carried within the cage meshing with the axle gears and seated against said plane bearing surfaces, and a pin extending through at least one of said arms and the plane bearing surfaces, said differential pinions being sleeved on said pin.

In testimony whereof we affix our signatures.

CHARLES R. SHORT.
VICTOR HUGHES.